(12) United States Patent
Jun et al.

(10) Patent No.: US 12,308,376 B2
(45) Date of Patent: May 20, 2025

(54) ELECTRODE PACKAGING DEVICE AND METHOD

(71) Applicant: LG Energy Solution, Ltd., Seoul (KR)

(72) Inventors: Sangeun Jun, Daejeon (KR); Byeong Oh Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 334 days.

(21) Appl. No.: 18/007,633

(22) PCT Filed: Mar. 7, 2022

(86) PCT No.: PCT/KR2022/003145
§ 371 (c)(1),
(2) Date: Dec. 1, 2022

(87) PCT Pub. No.: WO2022/196992
PCT Pub. Date: Sep. 22, 2022

(65) Prior Publication Data
US 2023/0246221 A1 Aug. 3, 2023

(30) Foreign Application Priority Data

Mar. 16, 2021 (KR) .................. 10-2021-0034183
Jan. 27, 2022 (KR) .................. 10-2022-0012249

(51) Int. Cl.
*H01M 10/00* (2006.01)
*H01M 10/04* (2006.01)
(Continued)

(52) U.S. Cl.
CPC ... *H01M 10/0409* (2013.01); *H01M 10/0431* (2013.01); *H01M 50/105* (2021.01);
(Continued)

(58) Field of Classification Search
CPC ............. H01M 50/474; H01M 50/477; H01M 50/121; H01M 50/119; H01M 50/124
See application file for complete search history.

(56) References Cited

U.S. PATENT DOCUMENTS

| 7,563,534 B2 | 7/2009 | Goishihara |
| 10,148,242 B2 | 12/2018 | Kim |
| 2018/0309092 A1 | 10/2018 | Fujishima |

FOREIGN PATENT DOCUMENTS

| JP | H0542904 A | 2/1993 |
| JP | 2005255225 A | 9/2005 |

(Continued)

OTHER PUBLICATIONS

Azuma et al., Belt-shaped Article Roll Packaging Tool, Moisture-proof Packaging Film And Packaging Body, Jun. 2008, See the Abstract. (Year: 2008).*

(Continued)

*Primary Examiner* — Anca Eoff
*Assistant Examiner* — Monique M Wills
(74) *Attorney, Agent, or Firm* — Lerner David LLP

(57) ABSTRACT

An electrode packing device includes: a transferring unit that transfers a wound electrode; and a packaging unit for packaging the electrode transferred by the transferring unit, wherein the packaging unit includes: a packaging bag supporting part for supporting the inlet of the packaging bag in an opened state; an electrode supporting part that supports the electrode from the outside the packaging bag, after the electrode is put into the packaging bag; and a sealing part that seals the inlet of the packaging bag, and the electrode supporting part includes a gripper that presses the core of the electrode and a side pad that presses the side of the electrode in a state in which the electrode is put in the packaging bag.

11 Claims, 12 Drawing Sheets

(51) Int. Cl.
    *H01M 50/105*     (2021.01)
    *H01M 50/119*     (2021.01)
    *H01M 50/121*     (2021.01)
    *H01M 50/124*     (2021.01)
    *H01M 50/474*     (2021.01)
    *H01M 50/477*     (2021.01)

(52) U.S. Cl.
    CPC ....... *H01M 50/119* (2021.01); *H01M 50/121* (2021.01); *H01M 50/124* (2021.01); *H01M 50/474* (2021.01); *H01M 50/477* (2021.01)

(56) References Cited

FOREIGN PATENT DOCUMENTS

| | | | |
|---|---|---|---|
| JP | 4095154 B2 * | 6/2008 | .......... H01M 50/474 |
| JP | 2010018350 A | 1/2010 | |
| JP | 4916904 B2 | 4/2012 | |
| JP | 2012218785 A | 11/2012 | |
| JP | 2016196323 A | 11/2016 | |
| KR | 20050016059 A | 2/2005 | |
| KR | 100982864 B1 | 9/2010 | |
| KR | 20170012912 A | 2/2017 | |
| KR | 20170112392 A | 10/2017 | |

OTHER PUBLICATIONS

Extended European Search Report including Written Opinion for Application No. 22771658.6 dated Jul. 18, 2024. 9 pgs.
International Search Report for Application No. PCT/KR2022/003145 mailed Jun. 28, 2022, pp. 1-3.

\* cited by examiner

[Fig. 5]
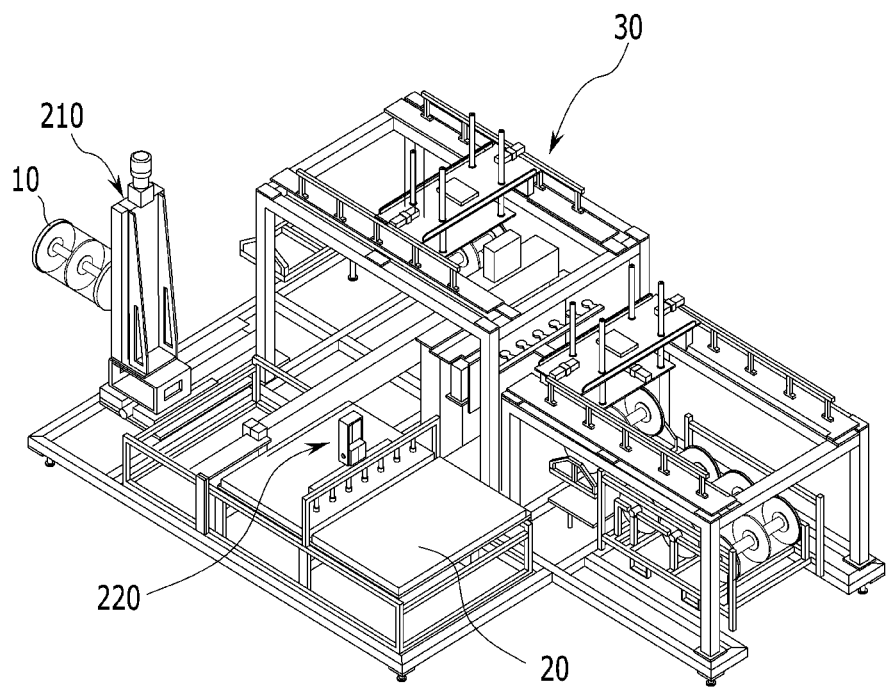

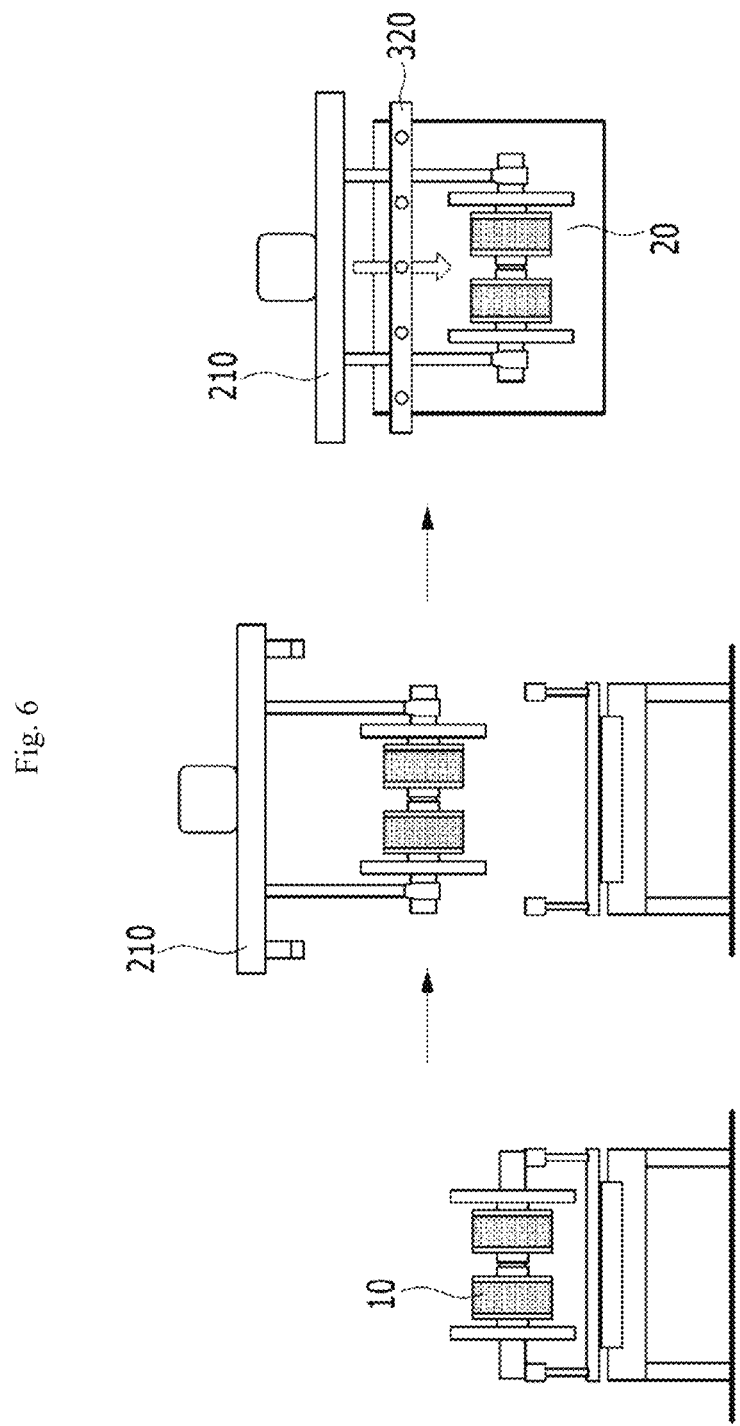

[Fig. 7]
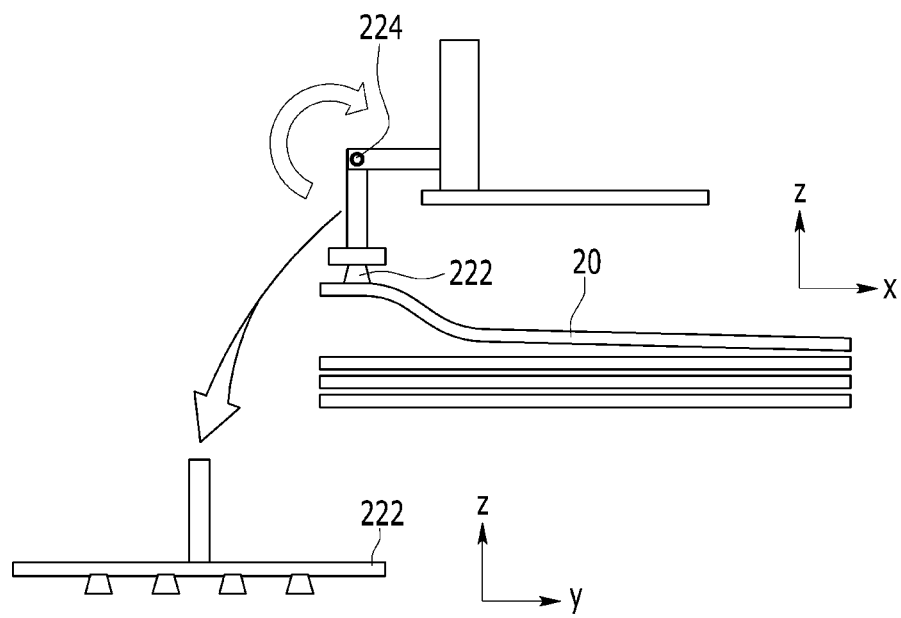

[Fig. 8]
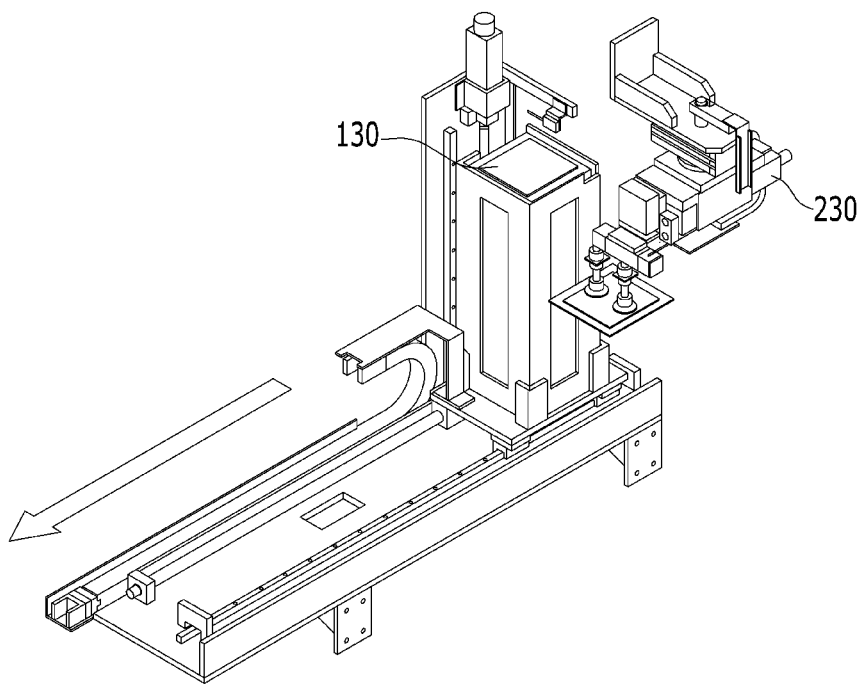

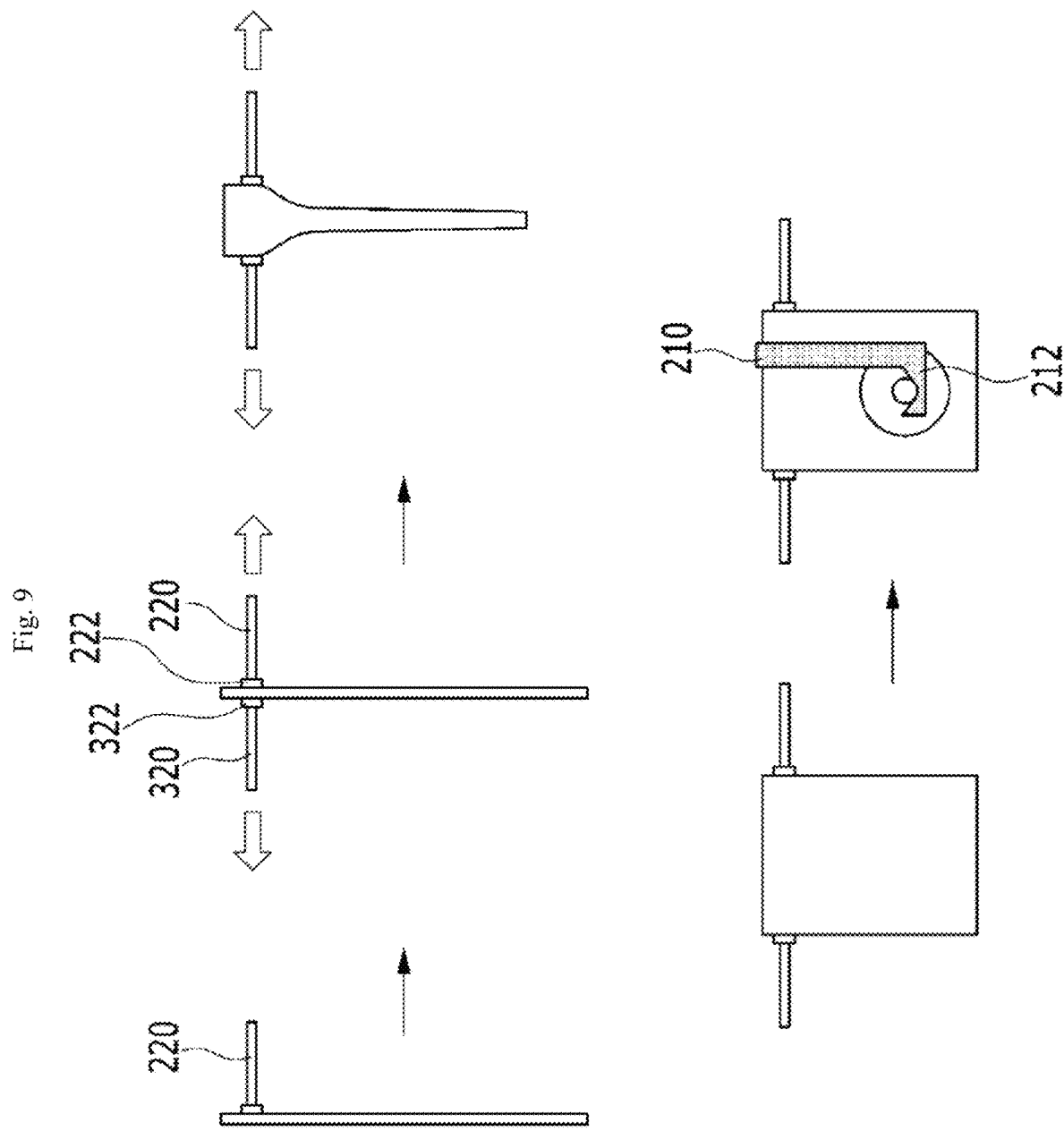

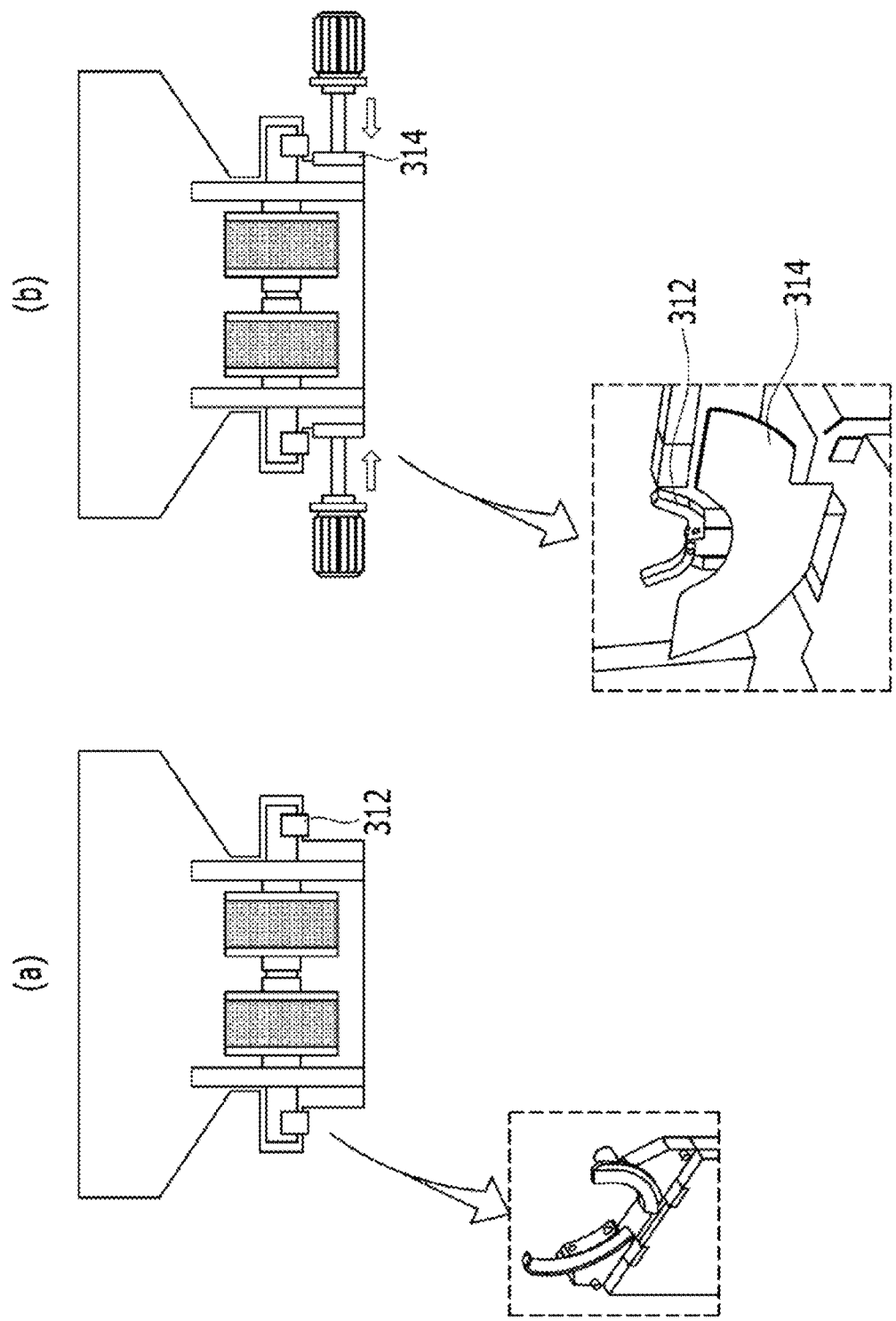

[Fig. 11]
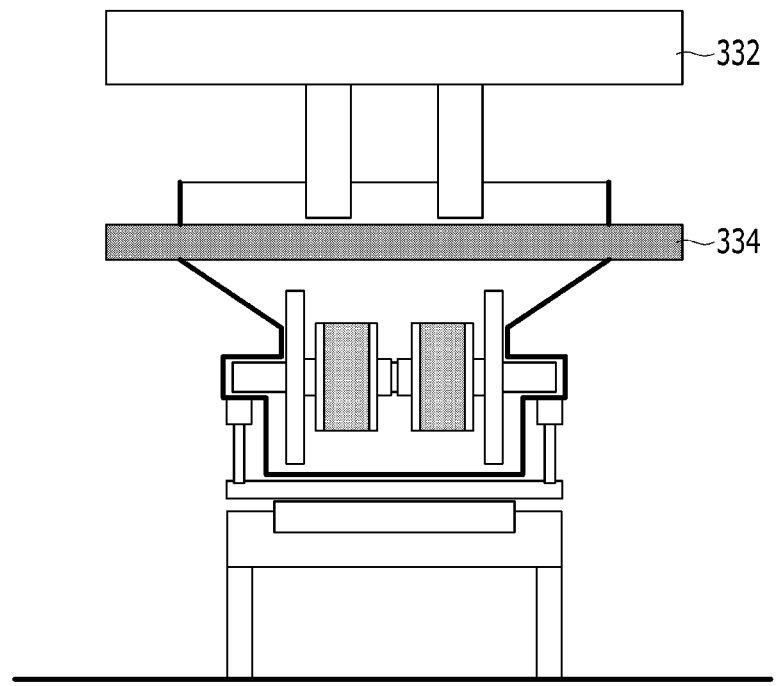

[Fig. 12]
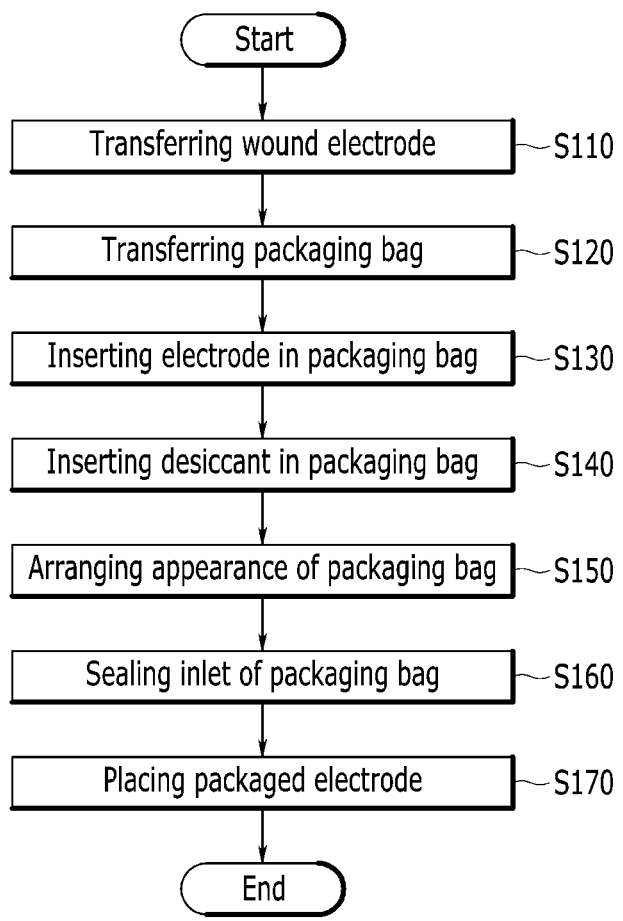

ELECTRODE PACKAGING DEVICE AND METHOD

CROSS-REFERENCE TO RELATED APPLICATIONS

The present application is a national phase entry under 35 U.S.C. § 371 of the International Application No. PCT/KR2022/003145 filed on Mar. 7, 2022, which claims priority from Korean Patent Application No. 10-2021-0034183 filed in the Korean Intellectual Property Office on Mar. 16, 2021, and Korean Patent Application No. 10-2022-0012249 filed on Jan. 27, 2022, all of which are incorporated herein by reference in their entireties.

FIELD OF THE INVENTION

The present invention relates to a device and a method for packing an electrode, more specifically, relates to a device and a method for packing an electrode for automatically packing electrodes.

BACKGROUND OF THE INVENTION

As development of technologies and demands for mobile devices are increased, there is a rapidly increasing demand for rechargeable batteries as energy sources. Particularly, the rechargeable battery is attracting a lot of interest as an energy source for a power device such as an electric bicycle, an electric vehicle, and a hybrid electric vehicle as well as mobile devices such as mobile phones, digital cameras, notebook computers, and wearable devices.

According to a shape of a battery case, the rechargeable battery is classified into a cylindrical battery and a prismatic battery in which the electrode assembly is embedded in a cylindrical or prismatic metal can, and a pouch-type battery in which the electrode assembly is embedded in a pouch-type case of an aluminum laminate sheet.

In addition, the rechargeable battery may be classified according to whether an electrode assembly of a structure in which a positive electrode, a negative electrode, and a separator interposed between the positive and negative electrodes are stacked is disposed. Typically, a jelly roll-type electrode assembly having a structure in which long sheet-shaped positive electrodes and negative electrodes are wound with a separator interposed therebetween, and a stack type electrode assembly in which a plurality of positive and negative electrodes cut by a unit of a predetermined size are sequentially stacked with a separator interposed therebetween may be mentioned. Recently, in order to solve the problem of the jelly roll electrode assembly and the stack electrode assembly, a stack/folding electrode assembly, which is a mixture of the jelly roll type and stack type, has been developed.

As a method for manufacturing the electrode of the rechargeable battery, a method of dispersing an active material, a conductive material and/or a binder in a solvent to prepare a slurry and then applying the slurry directly to a current collector to form the electrode, or a method applying the slurry on an upper part of a separate support and then laminating a film to prevent it from being peeled off from the support on the current collector to form the electrode have been proposed. The sheet-shaped electrode (hereinafter referred to as an electrode sheet) formed by applying the slurry is mainly cut at regular intervals through a pressing, a slitting, or a drying process to produce unit electrodes such as positive or negative electrodes has been proposed.

On the other hand, the electrode sheet may be moved or carried out in the wound state on a roll during or after the process described above, and may be packaged to minimize the influence of external air or moisture when moving or taking it out. In order to minimize a defect rate of a final product, although the electrodes in the state before the assembly must be protected from the external environment, it is a fact that the electrode has been mainly packaged manually because there is no known electrode packaging device or known electrode packaging method in the prior art. However, the manual electrode packaging can not only damage the electrode, but also has several problems, such as increased labor costs due to use of additional personnel, and safety accidents caused by high-load electrodes.

In addition, for the safe packaging of the electrode, a method of wrapping the electrode by wrapping a wrapping paper around the wound electrode circumference has been devised, but it has not only been weak in protecting both sides of the electrode, but also had a problem in that vacuum packaging was impossible.

Considering a recent surge in market demand for the rechargeable batteries, it is difficult to continue the manual electrode packaging like the present one, so a standardized packaging method or a device therefor for safely moving the electrode is needed.

BRIEF SUMMARY OF THE INVENTION

The task to be solved of the present invention is to provide an electrode packing device and a method therefor that may minimize damage to the electrode, reduce cost/time, and prevent safety accidents due to the electrode manufacturing.

The problem to be solved by the present invention is not limited to the above-mentioned problems, and problems not mentioned will be clearly understood by those of ordinary skill in the art to which the present invention belongs from the present specification and the accompanying drawings.

An electrode packing device according to an embodiment of the present invention includes: a transferring unit that transfers a wound electrode; and a packaging unit for packaging the electrode transferred by the transferring unit, wherein the packaging unit includes: a packaging bag supporting part for supporting the inlet of the packaging bag in an opened state; an electrode supporting part that supports the electrode from the outside the packaging bag, after the electrode is put into the packaging bag; and a sealing part that seals the inlet of the packaging bag, and the electrode supporting part includes a gripper that presses the core of the electrode and a side pad that presses the side of the electrode in a state in which the electrode is put in the packaging bag.

The gripper may include two finger units, and the core of the electrode may be positioned between two finger units.

The side pad may be plate-shaped, and a groove may be formed in the side pad to prevent interference with the gripper.

The side pad may be semicircular in shape, and may be positioned below the gripper.

The packaging bag supporting part may include at least one absorption unit, and the absorption unit may have an absorption surface that is vacuum-absorbed with one surface of the packaging bag.

The sealing part may include a vacuum unit for removing air inside the packaging bag, and a heater unit for sealing the inlet of the packaging bag.

The transferring unit may include a desiccant transferring unit for putting a desiccant into the packaging bag.

The electrode packing device may further include a collecting unit in a form of a rack for placing the packaged electrode.

An electrode packaging method according to another embodiment of the present invention includes: transferring a wound electrode to a packaging position by a transferring unit; inserting the electrode into the inlet of the packaging bag supported by the packaging bag supporting part; supporting the electrode from the outside the packaging bag by an electrode supporting part; and sealing the inlet of the packaging bag by a sealing part, wherein the supporting of the electrode includes pressing the core of the electrode through the gripper; and pressing the side of the electrode through the side pad.

Before the sealing of the inlet of the packaging bag, inserting the desiccant into the inlet of the packaging bag supported by the packaging bag supporting part may be further included.

After the sealing of the inlet of the packaging bag, placing the packaged electrode to a collecting unit may be further included.

The packaged electrode according to another embodiment of the present invention is packaged by the above-described electrode packing device.

The packaged electrode may include an electrode wound with a rectangular electrode sheet and a packaging bag packaging the outer surface of the electrode, and the electrode and the packaging bag may be in close contact with each other.

A desiccant provided inside the packaging bag may be further included.

The packaging bag may include a first packaging bag and a second packaging bag, and the first packaging bag may be a polymer material, while the second packaging bag is a metal material.

According to embodiments, as the present invention provides an automated electrode packing device and method, when the electrode is moved or taken out, damage to the electrode due to the external environment may be minimized, a labor cost for an electrode manufacturing may be reduced, and safety accidents caused by a high-load electrode may be prevented.

The effect of the present invention is not limited to the above-mentioned effects, and effects not mentioned will be clearly understood by a person of ordinary skill in the technical field to which the present invention belongs from this specification and the accompanying drawings.

BRIEF DESCRIPTION OF THE DRAWINGS

FIG. 5 is a view indicating a transferring unit of an electrode packing device according to an embodiment of the present invention.

FIG. 6 is a view showing an operation of an electrode transferring unit according to an embodiment of the present invention.

FIG. 7 is a view showing a packaging bag transferring unit according to an embodiment of the present invention.

FIG. 8 is a view showing a desiccant transferring unit according to an embodiment of the present invention.

FIG. 9 is a view showing an operation of a packaging bag supporting part according to an embodiment of the present invention.

FIG. 10 is a view showing an operation of an electrode supporting part according to an embodiment of the present invention.

FIG. 11 is a view showing a sealing part according to an embodiment of the present invention.

FIG. 12 is a flowchart of an electrode packaging method according to an embodiment of the present invention.

DETAILED DESCRIPTION

Figure 1:
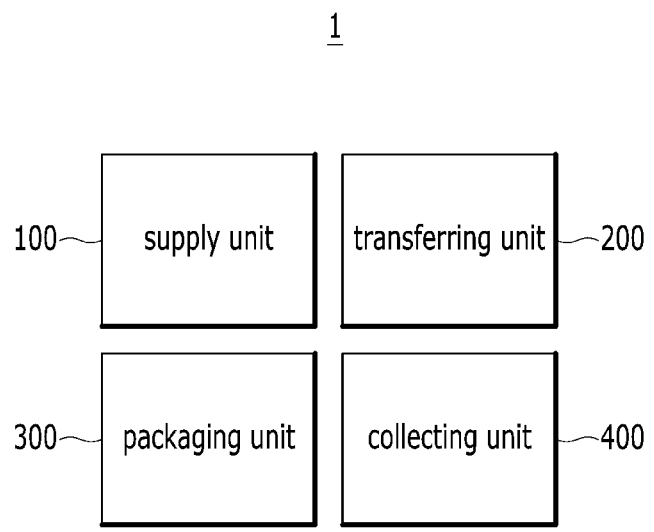
FIG. 1 is a block diagram showing a configuration of an electrode packing device according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clarify the present invention, parts that are not connected to the description will be omitted, and the same elements or equivalents are referred to with the same reference numerals throughout the specification.

In addition, since the size and thickness of each component shown in the drawing are arbitrarily enlarged or reduced for convenience of explanation, it is self-evident that the content of the present invention is not limited to the shown. In the drawing below, the thickness of each layer is enlarged to clearly express various layers and areas. In the following drawings, for convenience of explanation, the thickness of some layers and areas is exaggerated.

It will be understood that when an element such as a layer, film, region, or substrate is referred to as being "on" another element, it can be directly on the other element or intervening elements may also be present. By contrast, it will be understood that when an element is referred to as being "directly on" another element, no intervening elements are present. Further, in the specification, the word "on" or "above" means positioned on or below the object portion, and does not necessarily mean positioned on the upper side of the object portion based on a gravitational direction. On the other hand, as in explaining that it is "on" or "above" another part, explaining being "under" or "under" another part may also be understood with reference to the above description.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above, and the phrase "on a cross-section" means when a cross-section taken by vertically cutting an object portion is viewed from the side.

Hereinafter, an electrode packing device according to an embodiment of the present invention is described.

Figure 2:
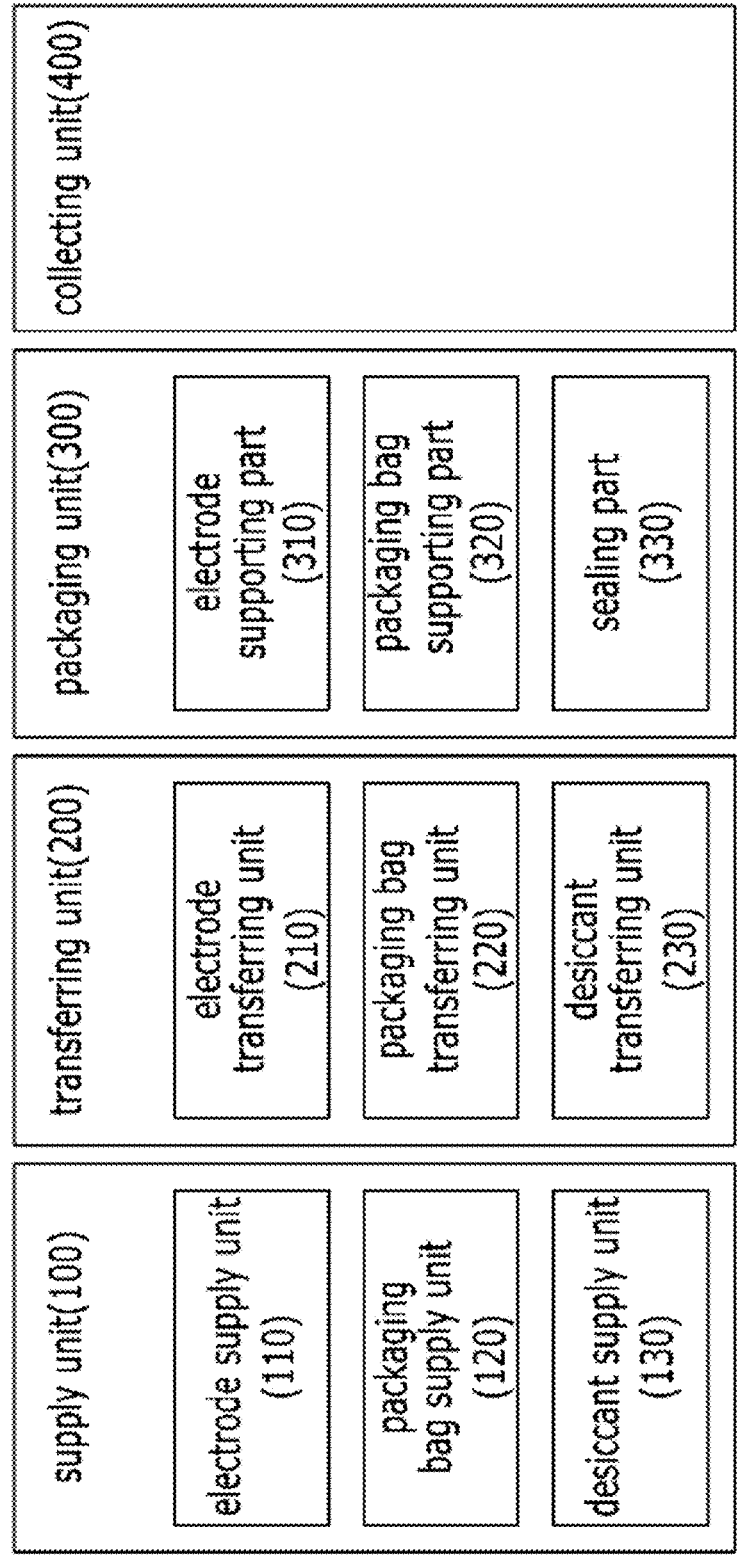
FIG. 2 is a block diagram showing a detailed configuration of an electrode packing device according to FIG. 1.
Figure 3:
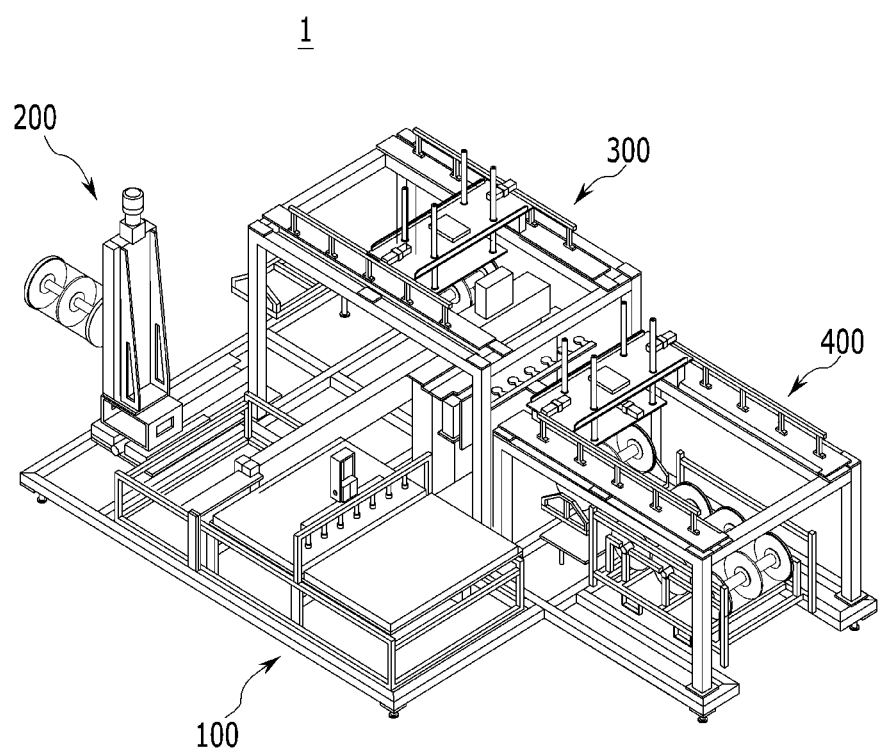
FIG. 3 is a perspective view of an electrode packing device according to an embodiment of the present invention.
Figure 4:
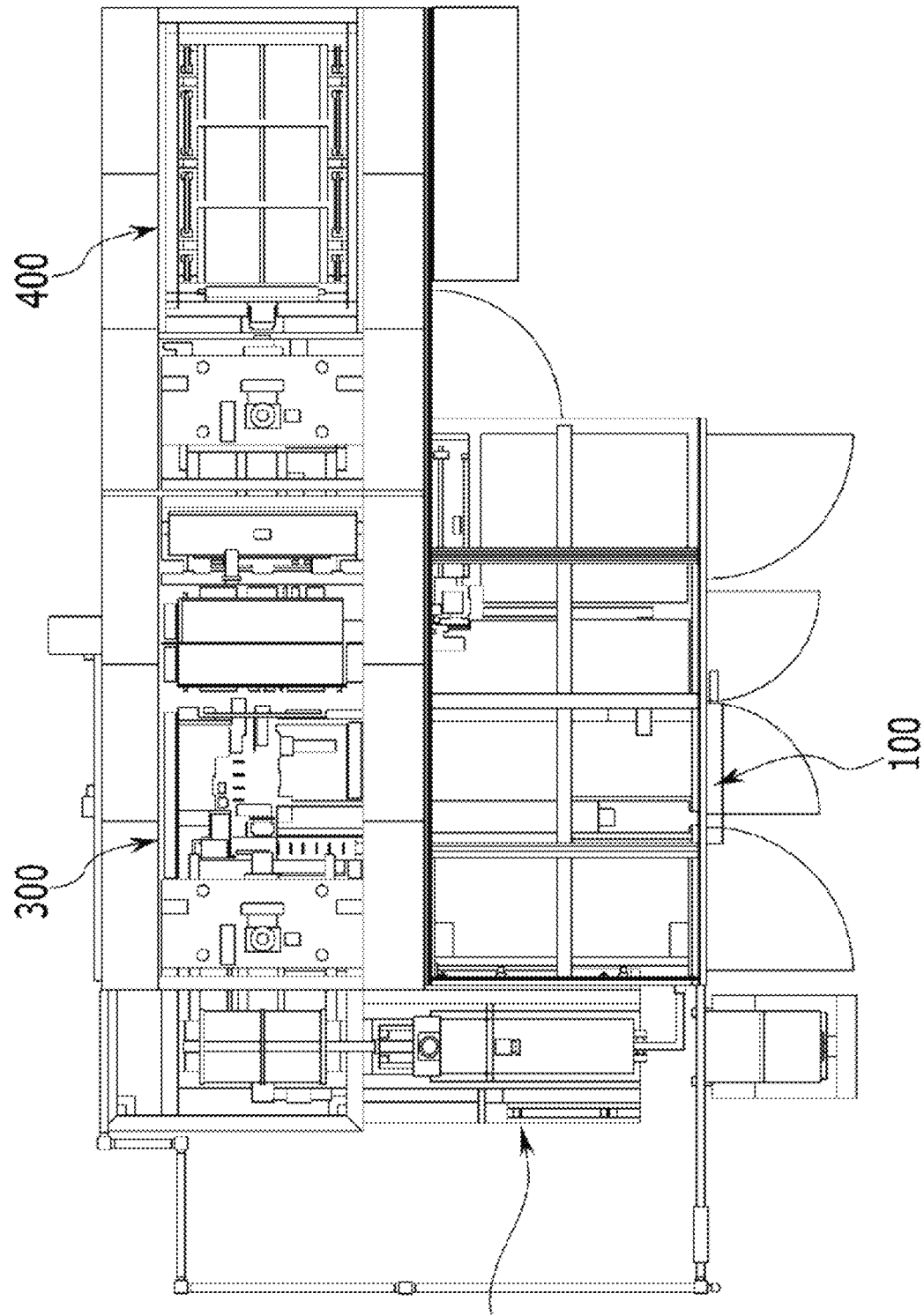
FIG. 4 is a top plan view of an electrode packing device of FIG. 3.

FIG. 1 is a block diagram showing a configuration of an electrode packing device according to an embodiment of the present invention, FIG. 2 is a block diagram showing a detailed configuration of an electrode packing device according to FIG. 1, FIG. 3 is a perspective view of an electrode packing device according to an embodiment of the present invention, and FIG. 4 is a top plan view of an electrode packing device of FIG. 3.

Referring to FIG. 1 to FIG. 4, an electrode packing device 1 according to embodiment of the present invention may include a supply unit 100 for supplying an electrode 10, a packaging bag 20 or a desiccant 30, and the like, a transferring unit 200 for transferring the electrode 10, the packaging bag 20 or the desiccant 30, the like from the supply unit 100, a packaging unit 300 for packaging the electrode 10 by putting the electrode 10 into the packaging bag 20 and sealing the packaging bag 20 and/or a collecting unit 400 where the electrode 10 packaged by the packaging unit 300 stays before being taken out.

The electrode 10 is a target of the electrode packing device 1, and may be a rectangular electrode sheet that is wound. The electrode sheet may be formed by coating the electrode slurry to the current collector, where the electrode slurry may typically include an electrode active material, a conductive material, a binder, and a solvent, but is not limited thereto. Here, the current collector may be formed by using stainless steel, aluminum, copper, nickel, titanium, calcined carbon, etc, and may be provided in various forms such as a film, a sheet, a foil, a net, a porous body, a foam, a non-woven fabric, etc.

The packaging bag 20 may be for blocking the electrode 10 from the external environment by packaging the outer surface of the electrode 10. One side of the packaging bag 20 may be provided in an opened state so that the electrode 10 may be inserted. In addition to the opened side, the other corners of the packaging bag 20 may be provided in a closed state to prevent the separation of the electrode 10. When the opened side of the packaging bag 20 is sealed by a sealing part 330 to be described later after the electrode 10 and/or the desiccant 30 is inserted, the packaging bag 20 may be in a completely closed state. Hereinafter, for better comprehension and ease of description, the opened side of the packaging bag 20 is referred to as 'an inlet'.

The packaging bag 20 may be manufactured of polyethylene (PE), high-density polyethylene (HDPE), low-density polyethylene (LDPE), polypropylene (PP), stretched polypropylene (OPP), poly(ethylene terephthalate) (PET), polyvinyl chloride (PVC), a deposited film (metalized film), or materials similar thereto. However, the material of the packaging bag 20 is not limited to the above-described examples, if materials have sufficient (thermal) safety enough to protect the electrode 10 from the outside or sufficient tensile strength not to be easily damaged by an external force, they may be used as the material for the packaging bag 20.

The desiccant 30 may be for removing moisture remaining in the electrode 10 before being packaged in the packaging bag 20 or moisture that may be included in the packaging process. The desiccant 30 may be added before or after the electrode 10 is inserted, that is, before the packaging bag 20 is sealed. The desiccant 30 may be made of silica gel, but is not limited thereto.

The supply unit 100 may refer to a space provided to store or stay the above-described electrode 10, packaging bag 20, or desiccant 30, or a configuration for this. The electrode 10, the packaging bag 20, or the desiccant 30 stored in the supply unit 100 may be moved to the packaging unit 300 by the transferring unit 200 and used in the packaging process.

The supply unit 100 may include an electrode supply unit 110, a packaging bag supply unit 120, or a desiccant supply unit 130. The electrode 10 of the wound state may be sequentially supplied to the electrode supply unit 110. A plurality of packaging bags 20 may be stacked on the packaging bag supply unit 120. Here, the packaging bag 20 may be stacked in the vertical direction so that one surface thereof faces an earth surface, but this is not necessarily the case, and may be differently disposed according to the intention of the designer. The desiccant 30 in a form of particles may be stored in the desiccant supply unit 130, or the desiccant 30 in a form of a pouch may be stacked and stored. The desiccant supply unit 130 may be disposed within a packaging position, where the 'the packaging position' may refer to a predetermined space provided for the inlet of the packaging bag 20 to be opened and the electrode 10 to be introduced through the inlet of the packaging bag 20.

The transferring unit 200 may be for moving the electrode 10, the packaging bag 20, or the desiccant 30 stored/mounted in the supply unit 100 to the packaging position of the packaging unit 300. The transferring unit 200 may include an electrode transferring unit 210, a packaging bag transferring unit 220, or a desiccant transferring unit 230. Details of the transferring unit 200 are described later through drawings.

The packaging unit 300 may be for sealing the electrode 10 transferred to the packaging position in the packaging bag 20. The packaging unit 300 may include an electrode supporting part 310 that trims the outer shape of the packaging bag 20 by supporting the electrode 10 from the outside the packaging bag 20, or a packaging bag supporting part 320 that opens the inlet of the packaging bag 20 and supports the opened inlet and/or a sealing part 330 for sealing the inlet after the electrode 10 is inserted. Further details of the packaging unit 300 are described later through drawings.

The collecting unit 400 may refer to a space in which the packaged electrode 10 stays before being taken out or to a configuration therefor. The collecting unit 400 may include a rack on which the packaged electrode 10 may be mounted.

The rack may include two bars spaced apart, and the core protruded to both ends on the width direction of the electrode 10 may be positioned on the two bars spaced apart. The core of the electrode 10 may be rolled on the bar, whereby the electrode 10 may be moved in the horizontal direction along the bar. When the electrode 10 of which the packaging is completed is sequentially delivered to the collecting unit 400, the electrode 10 staying in the collecting unit 400 may be moved in a direction away from the packaging position along the bar by being pushed by the electrode 10 that is delivered later. Although not specifically illustrated, a groove for limiting the range in which the electrode 10 moves may be provided in the bar.

Hereinafter, the transferring unit according to an embodiment of the present invention is described in more detail.

FIG. 5 is a view indicating a transferring unit of an electrode packing device according to an embodiment of the present invention, FIG. 6 is a view showing an operation of an electrode transferring unit according to an embodiment of the present invention, FIG. 7 is a view showing a packaging bag transferring unit according to an embodiment of the present invention, and FIG. 8 is a view showing a desiccant transferring unit according to an embodiment of the present invention.

The electrode transferring unit 210 according to an embodiment of the present invention may move the electrode 10 supplied from the electrode supply unit 110 to the packaging position. The electrode transferring unit 210 may be designed so that it may be driven back and forth or left and right along the rail. The electrode transferring unit 210 may move the electrode 10 in the horizontal direction to correspond to the inlet of the packaging bag 20, and when the electrode 10 is positioned on the inlet of the packaging bag 20, the electrode 10 may be lowered to insert the electrode 10 into the packaging bag 20.

Referring to FIG. 6, the electrode transferring unit 210 of the present embodiment may include a lift or a hoist that can move the electrode 10 up and down. The above-described lift or hoist may include a hook 212 (referring to FIG. 9). The curved part of the hook may be designed to correspond to the core of the wound roll electrode 10. The electrode transferring unit 210 may be coupled to the core of the electrode 10 through a hook, and the electrode 10 may be suspended from the hook and lifted.

The packaging bag transferring unit 220 according to an embodiment of the present invention may move the packaging bag 20 supplied from the packaging bag supply unit 120 to the packaging position. The packaging bag transferring unit 220 may be designed to be able to run forward or backward or left and right along the rail, which may be referred to as a body part (without reference numerals). In addition, the packaging bag transferring unit 220 may include a gripping part 222 for lifting the packaging bag 20 and a tilting part 224 for tilting the gripping part 222.

Referring to FIG. 7, the gripping part 222 of the packaging bag transferring unit 220 of the present embodiment may include a housing in which a hollow space is formed and a gripping unit temporarily attachable to an object by using a vacuum force formed by the hollow. The gripping unit is disposed on one surface of the housing, and if there are two or more gripping units, they may be disposed side by side along a straight line. Each gripping unit may have a gripping surface in contact with one surface of the packaging bag 20, and a gripping port communicating with the hollow space of the housing may be positioned on the gripping surface. The gripping surface of the gripping unit can be moved to make an angle with or not to make an angle with a ground surface (a floor) by the tilting part 224 designed to be rotatable about the axis.

Specifically, in the packaging bag supply unit 120, the packaging bag 20 may be stacked so that one surface thereof is parallel to the ground surface, and the gripping unit of the packaging bag transferring unit 220 may be lowered so as to be close to one surface of the packaging bag 20 in a state where the gripping surface faces the ground surface. When the packaging bag 20 and the gripping surface are attached by the vacuum force, the gripping unit may be moved along the shown arrow by the tilting part 224, so that the gripping surface and one surface of the gripped packaging bag 20 absorbed with the gripping surface may be positioned to be vertical to the floor. When the other side of the packaging bag 20 is supported by the packaging bag supporting part 320 to be described later, and the inlet of the packaging bag 20 is opened toward the ceiling, the electrode 10 may be put into the packaging bag 20.

On the other hand, although not specifically shown, the packaging bag transferring unit 220 may be designed to be movable up and down. This may be because the packaging bag supply unit 120 in which the packaging bag 20 is positioned has to be positioned close to the bottom surface, and the packaging bag transferring unit 220 has to be moved downward to obtain the packaging bag 20. In addition, this may be because the position of the packaging bag transferring unit 220 must be displaced to correspond to the position of the packaging bag supporting part 320 to be described later.

The desiccant transferring unit 230 according to an embodiment of the present invention may be for putting the desiccant 30 into the packaging bag 20. As shown in FIG. 8, the desiccant 30 may be put into the packaging bag 20 along the arrow direction by the desiccant transferring unit 230 of the present embodiment. Here, the desiccant transferring unit 230 may be designed as a robot for putting the desiccant 30 stored in the desiccant supply unit 130 into the packaging bag 20. Although not specifically shown, the desiccant transferring unit 230 may be positioned in a space in which the inlet of the packaging bag 20 is opened to facilitate the input of the desiccant 30, and specifically, the desiccant transferring unit 230 may be positioned above the opened inlet of the packaging bag 20 have.

Hereinafter, the packaging unit according to an embodiment of the present invention is described in more detail.

In the packaging bag supporting part 320 according to an embodiment of the present invention, if the packaging bag 20 moves to the packaging position by the above-described packaging bag transferring unit 220, by supporting one surface of the packaging bag 20, the inlet of the packaging bag 20 may be opened, and the opened inlet may be maintained.

FIG. 9 is a view showing an operation of a packaging bag supporting part according to an embodiment of the present invention.

Referring to FIG. 9, the packaging bag supporting part 320 according to the present embodiment may include the gripping part 322 to support the packaging bag 20, and the gripping part 322 of the packaging bag supporting part 320 may be designed similar to the gripping part 222 of the above-described packaging bag transferring unit 220. Substantially, the gripping part 322 of the packaging bag supporting part 320 and the gripping part 222 of the packaging bag transferring unit 220 are substantially the same, but may be separated for convenience of explanation, and may be provided to be symmetrical to each other.

The packaging bag supporting part 320 may open the inlet of the packaging bag 20. One surface of the packaging bag 20 is vacuum-gripped by the gripping part 222 of the packaging bag transferring unit 220 and moved to the packaging position, and the other surface of the moved packaging bag 20 may be supported by the vacuum gripping by the gripping part 322 of the packaging bag supporting part 320. The packaging bag transferring unit 220 and the packaging bag supporting part 320 attached to two surfaces of the packaging bag 20 may move in opposite directions, whereby the inlet of the packaging bag 20 may be opened.

Although not specifically shown, the packaging bag supporting part 320 may be designed to be movable up and down. This may be because the packaging bag transferring unit 220 and the packaging bag supporting part 320 must be displaced to correspond to each other. Also, this may be in order to adjust the distance between the transferred electrode 10 and the inlet of the packaging bag 20. Specifically, when the high load electrode 10 falls into the packaging bag 20, there is a fear that the packaging bag 20 is damaged. Accordingly, it may be preferable to minimize the falling distance of the electrode 10 by moving the packaging bag transferring unit 220 and/or the packaging bag supporting part 320 supporting the packaging bag 20 upward. Also, as be described later, the operation of the sealing part 330 in the packaging process of the electrode 10 may be linked with the operation of the packaging bag transferring unit 220 and/or the packaging bag supporting part 320, and in this process, the packaging bag transferring unit 220 and/or packaging bag supporting part 320 may have to be moved up and down so that the sealing part 330 and the position thereof correspond as much as possible.

On the other hand, when the packaging of the electrode 10 is completed, the electrode 10 may be hung on the rack of the collecting unit 400 and stored until taken out. At this time, if the packaging bag 20 is not in close contact along the outer shape of the electrode 10, it may be difficult for the core of the electrode 10 to be seated on the rack, and the packaging bag 20 may be damaged due to a tension acting around the core of the electrode 10 caught in the rack. Therefore, before the packaging of the electrode 10 is completed, the electrode supporting part 310 for arranging the appearance of the packaging bag 20 may be required.

FIG. 10 is a view showing an operation of an electrode supporting part according to an embodiment of the present invention.

Referring to FIG. 10, the electrode supporting part 310 according to an embodiment of the present invention may be for trimming the appearance of the packaging bag 20 after the electrode 10 is put into the packaging bag 20. The electrode supporting part 310 may include a gripper 312 for pressing the core of the electrode 10 and a side pad 314 for pressing the side of the electrode 10. Two gripper 312 and two side pad 314 may be provided, respectively, the gripper 312 may be disposed to pressurize the core protruded from both ends in the width direction of the electrode 10, and the side pad 314 may be disposed at both ends in the width direction of the electrode 10 to pressurize a radial cross-section (the side) of the wound electrode 10.

The gripper 312 may include two finger units, and each finger unit may be provided in a round shape. The core of the electrode 10 is mainly positioned between two finger units, but even if it is initially disposed to a different position, it may be moved and disposed between two finger units due to its round shape. The finger unit may move independently, and both ends of the electrode 10 may be spread apart or come closer so that the core of the electrode 10 may be seated on the gripper 312. The gripper 312 may grip the core of the electrode 10.

The side pad 314 may be provided in a circular or semicircular shape corresponding to the radial cross-section of the wound roll electrode 10. The side pad 314 may be provided in a plate shape, and since the gripper 312 is positioned around the core of the electrode 10, a groove may be formed in the side pad 314 to prevent an interference with the gripper 312. When the packaging is completed, the electrode 10 is seated in the rack of the collecting unit 400, since the tension mainly acts between the core of electrode 10 and the bottom surface of electrode 10, it may be preferable that the side pad 314 mainly presses the lower part of the cross-section of the electrode 10. Therefore, in order to minimize the interference between the electrode 10 and the collecting unit 400, the side pad 314 may be provided in a semicircular plate shape to correspond to the lower portion of the cross-section of the electrode 10 under the gripper 312 as shown.

When the electrode 10 and the desiccant 30 are put through the opened inlet of the packaging bag 20 by the packaging bag supporting part 320, and the outer shape of the packaging bag 20 is arranged in the electrode supporting part 310, the inlet of the packaging bag 20 may be sealed by the sealing part 330.

FIG. 11 is a view showing a sealing part according to an embodiment of the present invention.

Referring to FIG. 11, the sealing part 330 according to an embodiment of the present invention may include a vacuum unit 332 for removing an air inside the packaging bag 20 and a heater unit 334 for sealing the inlet.

The vacuum unit 332 may create a vacuum environment in the packaging bag 20. The vacuum unit 332 is disposed between the gripping part 222 of the packaging bag transferring unit 220 and the gripping part of the packaging bag supporting part 320, thereby it is possible to remove the air in the packaging bag 20. Through this, the vacuum unit 332 may allow the packaging bag 20 to be in close contact with the outer surface of the electrode 10. Here, the packaging bag transferring unit 220 and the packaging bag supporting part 320 may move toward each other so that the inlet of the packaging bag 20 corresponds to the vacuum unit 332. After the operation of the vacuum unit 332 is completed, the heater unit 334 moves toward the packaging bag 20, and a portion of the packaging bag 20 is heat-sealed by the heater unit 334, so that the inlet of the packaging bag 20 may be closed. A pair of heater units 334 may be provided, and a pair of heater units 334 may be respectively positioned on two surfaces of the packaging bag 20 to seal the inlet by pressing the packaging bag 20.

On the other hand, if the vacuum unit 332 or the heater unit 334 is operated in a state in which wrinkles of the packaging bag 20 surrounding the outer surface of the electrode 10 are not removed, it may be difficult to adhere the packaging bag 20 to the outer surface of the electrode 10. If the packaging bag 20 is not in close contact with the outer surface of the electrode 10, it may be difficult to protect the electrode 10 from external moisture/air. Also, it may be difficult for the packaged electrode 10 to be mounted on the rack of the collecting unit 400 afterward. Accordingly, the sealing part 330 may further include a clamp unit (not shown) for straightening the wrinkles of the packaging bag 20 before the operation of the vacuum unit 332 or the heater unit 334 described above. The clamp unit may be provided as a pair of finger units, but the shape of the finger unit may be different from that of the finger unit of the gripper 312 described above.

The clamp unit may be for arranging the inlet of the packaging bag 20 positioned on the circumferential surface of the electrode 10 or on both radial cross-sections of the electrode 10. The clamp unit may be for forming at least a portion of the inlet of the packaging bag 20 deformed according to the shape of the electrode 10 in a straight shape. A plurality of clamp units may be provided along the axial direction of the electrode 10 or one surface of the packaging bag 20.

On the other hand, in the above description, it has been described that the clamp unit is a configuration of the sealing part 330, but considering the function of the clamp unit supporting the packaging bag 20, the clamp unit may be provided as a configuration of the packaging bag supporting part 320. Accordingly, the packaging bag supporting part 320 may include gripping part 322 including the above-described gripping unit and a clamp unit.

On the other hand, each configuration of the electrode packing device described above may be provided in a form in which a part is omitted as necessary, or may be provided in a form further including an additional configuration, this have to be interpreted to be also included in the spirit of the present invention.

For example, although the device of the present invention has been described based on that the desiccant 30 is provided in the packaging bag 20, the desiccant 30 may be optionally provided. In addition, since a material having a component similar to that of desiccant 30 may be coated to the inner surface of the packaging bag 20, it may not be necessary to add an additional desiccant 30 to the packaging bag 20. In this case, the desiccant supply unit 130 and the desiccant transferring unit 230 included in the electrode packing device 1 of the present invention may be omitted, and it is self-evident that the electrode packing device 1 without such a configuration also belongs to the spirit of the present invention.

Hereinafter, an electrode packaging method according to an embodiment of the present invention is described.

On the other hand, the electrode packaging method according to an embodiment of the present invention may be performed by the above-described electrode packing device. But, it is not necessarily so.

FIG. 12 is a flowchart of an electrode packaging method according to an embodiment of the present invention.

Referring to FIG. 12, an electrode packaging method S100 according to an embodiment of the present invention may include transferring a wound electrode 10 (S110), transferring a packaging bag 20 (S120), inserting the electrode 10 into the packaging bag 20 (S130), inserting the desiccant 30 in the packaging bag 20 (S140), arranging the appearance of the packaging bag 20 (S150), sealing the inlet of the packaging bag 20 (S160), and/or mounting the packaged electrode 10 (S170).

Here, the procedure of the electrode packaging method S100 is not limited to the above, and the method may be performed in another order. As one example, transferring the wound electrode 10 (S110) and the transferring the packaging bag 20 (S120) may be simultaneously performed, and transferring the wound electrode 10 (S110) may be performed after transferring the packaging bag 20 (S120). As another example, inserting the desiccant 30 into the packaging bag 20 (S140) may be performed before inserting the electrode 10 into the packaging bag 20 (S130).

Also, here, the electrode packaging method S100 may exclude some of the above-described steps, or may further include an additional step. For example, inserting the desiccant 30 into the packaging bag 20 (S140) in the electrode packaging method S100 may be omitted.

Hereinafter, each step is described in more detail.

The electrode 10 positioned in the electrode supply unit 110 may be moved to the packaging position by the electrode transferring unit 210 (S110). This may be explained with reference to the above content, and more specifically, may be described with reference to the content of FIG. 5 and FIG. 6.

The packaging bag 20 positioned in the packaging bag supply unit 120 may be moved to the packaging position by the packaging bag transferring unit 220 S120. This may be explained with reference to the above content, and more specifically, may be described with reference to the content of FIG. 5 and FIG. 7.

Here, the packaging bag 20 may be lifted by the gripping part 222 of the packaging bag transferring unit 220, and then moved to the packaging position through a body part to be drivable (no reference numeral). At this time, after the gripping surface of the gripping part 222 is attached to one surface of packaging bag 20, if the tilting part 224 rotates about the axis, the gripping surface of the gripping part 222 may be positioned vertically to the floor, and one surface of the packaging bag 20 may be moved to the packaging position in a state vertical to the floor. However, this is not necessarily the case, and after the packaging bag 20 is moved to the packaging position, one surface of the packaging bag 20 may be positioned in a state vertical to the floor by the operation of the tilting part 224.

The electrode 10 may be transferred into the inlet of the packaging bag 20 opened by the electrode transferring unit 210 (S130). Here, the inlet of the packaging bag 20 may be opened and supported by the packaging bag supporting part 320. More specifically, the inlet of the packaging bag 20 may be opened and supported by the packaging bag transferring unit 220 and the packaging bag supporting part 320.

Accordingly, inserting the electrode 10 into the packaging bag 20 (S130) may include opening the inlet of the packaging bag 20 (S132) and inserting the electrode 10 into the inlet of the packaging bag 20 (S134). Opening the inlet of the packaging bag 20 (S132) may be described with reference to the content of FIG. 9 and inserting the electrode 10 into the inlet of the packaging bag 20 (S134) may be described with reference to the content of FIG. 6.

The desiccant 30 positioned in the desiccant supply unit 130 may be put into the inlet of the packaging bag 20 by the desiccant transferring unit 230 (S140). This may be explained with reference to the above content, and more specifically, it may be described with reference to the contents of FIG. 8.

When the electrode 10 is positioned in the packaging bag 20, the outer shape of the packaging bag 20 may be arranged by the electrode supporting part 310 S150. This may be explained with reference to the above content, and more specifically, it may be described with reference to the contents of FIG. 10.

The sealing part 330 may seal the inlet of the packaging bag 20 S160. This may be explained with reference to the above content, and more specifically, it may be described with reference to the contents of FIG. 11.

Meanwhile, in the sealing part 330, before the inlet of the packaging bag 20 is sealed, the shape of the inlet of the packaging bag 20 may be adjusted by the above-described finger unit. After the operation of the finger unit, the outer surface of the electrode 10 and the packaging bag 20 may be in close contact by the vacuum unit 332, and the inlet of the packaging bag 20 may be sealed by the heater unit 334.

The packaged electrode 10 may be placed in the collecting unit 400 until it is taken out (S170). This may be described with reference to the content of the collecting unit 400, so a detailed description is omitted.

Meanwhile, in the above electrode packing device 1 and electrode packaging method S100, it has been described that the electrode 10 is packaged by one packaging bag 20, but the electrode 10 may be packaged by two or more packaging bags 20.

When two or more packaging bags 20 are used for the packaging of electrode 10, the materials of two packaging bags 20 may be different. The packaging bag 20 may include a first packaging bag and a second packaging bag. Here, the first packaging bag may be made of a polymer material, and the second packaging bag may be made of a metal material. An example of a metal material for the second packaging bag is aluminum. As such, in the packaging process of the electrode 10, the above-described packaging bag 20 such as PE and the packaging bag 20 of a metal material such as aluminum may be provided, specifically, after the electrode 10 is packaged with the packaging bag 20 of a polymer material, it may be re-packaged with the packaging bag 20 of the metal material.

When two or more packaging bags 20 are used for the packaging of the electrode 10, the above-described electrode packing device and method may be partially modified to perform a continuous process by two packaging bags 20.

For example, the packaging bag supply unit 120 of the electrode packing device 1 may include a first packaging bag supply unit and a second packaging bag supply unit for storing each packaging bag 20. Here, the first packaging bag supply unit may supply the first packaging bag, and the second packaging bag supply unit may supply the second packaging bag.

Another example, the electrode packaging method S100, before placing the packaged electrode 10 (S170), may again repeat transferring the packaging bag 20 (S120), inserting the electrode 10 in the packaging bag 20 (S130), inserting the desiccant 30 in the packaging bag 20 (S140), arranging the appearance of the packaging bag 20 (S150) or sealing the inlet of the packaging bag 20 (S160).

Here, the repeating of the steps (S120) to (S160) may be packaging the electrode packaged with the first packaging bag into the second packaging bag. Therefore, in the steps (S120) to (S160) before the repeating, the packaging bag 20 may be described as a first packaging bag, and in the repeating of the steps (S120) to (S160), the electrode 10 may be described as an electrode packaged with the first packaging bag, and the packaging bag 20 may be described as the second packaging.

In addition, according to the design, the electrode packaging method S100 may not repeat all of the steps (S120) to (S160), but only some of them may be repeated. For example, in the electrode packaging method S100, inserting the desiccant 30 into the packaging bag 20 (S140) may not be repeated again. At this time, the desiccant 30 may be provided only to the packaging bag 20 positioned inside. Alternatively, the electrode packaging method S100 may not repeat arranging the appearance of the packaging bag 20 (S150) again.

Hereinafter, the packaged electrode according to an embodiment of the present invention is described.

The packaged electrode of the present embodiment is packaged by the above-described electrode packing device 1 and electrode packaging method 100S, and the contents overlapping with the above-described contents are omitted.

The packaged electrode of the present embodiment may include the electrode 10 wound in a rectangular electrode sheet and the packaging bag 20 for packaging the outer surface of the electrode 10. In addition, the packaged electrode of the present embodiment may further include a desiccant 30 for removing moisture inside the packaging bag 20.

The electrode 10 may be packaged in the packaging bag 20 by the electrode packing device 1 and the electrode packaging method 100S described above. In the packaged electrode, the electrode 10 and the packaging bag 20 may be in close contact. The electrode 10 and the packaging bag 20 may in contact with each other. This may be because, after the electrode 10 is put into the packaging bag 20, the inside of the packaging bag 20 is adjusted in a vacuum state by the vacuum unit 332, and then the inlet is sealed by the heater unit 334.

The electrode 10 may be doubly packaged. The electrode 10 may be packaged in two or more packaging bags 20. The packaging bag 20 may include a first packaging bag and a second packaging bag. After being packaged in the first packaging bag, the electrode 10 may be packaged in the second packaging bag. In the packaged electrode, the first packaging bag may be positioned inside the second packaging bag, and the second packaging bag may be positioned outside the first packaging bag. When the electrode 10 is double packaged, the electrode 10 may be put into the second packaging bag after being packaged with the first packaging bag by the above-described electrode packing device 1 and electrode packaging method 100S, and the inlet of the second packaging bag may be sealed, thereby the packaging of the electrode may be completed. Here, the desiccant 30 may be provided inside the first packaging bag before the sealing of the first packaging bag. In addition, the desiccant 30 may be provided inside the second packaging bag before the sealing of the second packaging bag.

The first packaging bag may be a polymer material, and the second packaging bag may be a metal material. By surrounding the first packaging bag of the polymer material with the second packaging bag of the metal material, moisture resistance of the packaged electrode may be improved. In addition, since the second packaging bag blocks the first packaging bag from the external environment, the damage to the first packaging bag due to the storage or transport may be prevented, and a durability of the packaged electrode may be improved.

The above description is merely illustrative of the technical spirit or scope of the present invention, and a person of ordinary skill in the art will readily appreciate that various modifications and equivalent arrangements are possible without materially departing from the novel teachings and advantages of the present invention. Therefore, the embodiments of the present invention described above may be implemented separately or in combination with each other.

Therefore, the embodiments disclosed in the present invention are not intended to limit the technical spirit or scope of the present invention, but to explain them, and the range of the technical spirit or scope of the present invention is not limited by the embodiments. The protection range of the present invention should be construed by the claims below, and all technical ideas within an equivalent range thought should be construed as being included within the scope of the present invention.

DESCRIPTION OF SYMBOLS

100: supply unit
110: electrode supply unit
120: packaging bag supply unit
130: desiccant supply unit
200: transferring unit
210: electrode transferring unit
220: packaging bag transferring unit
230: desiccant transferring unit
300: packaging unit
310: electrode supporting part
320: packaging bag supporting part
330: sealing part
400: collecting unit

The invention claimed is:

1. An electrode packing device comprising:
    a transferring unit configured to transfer a wound electrode; and
    a packaging unit for packaging the wound electrode transferred by the transferring unit in a packaging bag,
    wherein the packaging unit includes:
    a packaging bag supporting part for supporting an inlet of the packaging bag in an opened state;
    an electrode supporting part that supports the wound electrode from an outside of the packaging bag, after the wound electrode is put into the packaging bag; and
    a sealing part that seals the inlet of the packaging bag, and
    the electrode supporting part includes a gripper configured to press a core of the wound electrode and a side pad configured to press a side of the wound electrode in a state in which the wound electrode is put in the packaging bag.

2. The electrode packing device of claim 1, wherein:
    the gripper includes two finger units, and the core of the wound electrode is positioned between the two finger units.

3. The electrode packing device of claim 1, wherein
the side pad is plate-shaped, and
a groove is formed in the side pad to prevent an interference with the gripper.

4. The electrode packing device of claim 3, wherein
the side pad is semicircular in shape and positioned below the gripper.

5. The electrode packing device of claim 1, wherein
the packaging bag supporting part includes at least one gripping unit, and the gripping unit has an gripping surface configured to be vacuum-gripped with one surface of the packaging bag.

6. The electrode packing device of claim 1, wherein
the sealing part includes a vacuum unit for removing air inside the packaging bag and a heater unit for sealing the inlet of the packaging bag.

7. The electrode packing device of claim 1, wherein
the transferring unit includes a desiccant transferring unit for putting a desiccant into the packaging bag.

8. The electrode packing device of claim 1, wherein
the electrode packing device further includes a collecting unit in a form of a rack for placing the packaged electrode.

9. An electrode packaging method comprising:
transferring a wound electrode to a packaging position by a transferring unit;
inserting the wound electrode into an inlet of a packaging bag supported by a packaging bag supporting part;
supporting the wound electrode from an outside the packaging bag by an electrode supporting part; and
sealing the inlet of the packaging bag by a sealing part,
wherein the supporting of the wound electrode includes:
pressing a core of the wound electrode through a gripper; and
pressing a side of the wound electrode through a side pad.

10. The electrode packaging method of claim 9, further comprising,
before the sealing of the inlet of the packaging bag,
inserting a desiccant into the inlet of the packaging bag supported by the packaging bag supporting part.

11. The electrode packaging method of claim 9, further comprising,
after the sealing of the inlet of the packaging bag,
placing the packaged wound electrode to a collecting unit.

\* \* \* \* \*